(12) United States Patent
Kim et al.

(10) Patent No.: US 12,367,813 B2
(45) Date of Patent: Jul. 22, 2025

(54) ELECTRONIC DEVICE AND METHOD OF DRIVING ELECTRONIC DEVICE

(71) Applicant: Samsung Display Co., Ltd., Yongin-si (KR)

(72) Inventors: Hyungjin Kim, Yongin-si (KR); Jaesung Bae, Yongin-si (KR); Kyungsu Lee, Yongin-si (KR); Seokha Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/398,331

(22) Filed: Dec. 28, 2023

(65) Prior Publication Data

US 2024/0331613 A1 Oct. 3, 2024

(30) Foreign Application Priority Data

Mar. 27, 2023 (KR) ........................ 10-2023-0039451

(51) Int. Cl.
*G09G 3/32* (2016.01)
*G06F 1/16* (2006.01)

(52) U.S. Cl.
CPC ............. *G09G 3/32* (2013.01); *G06F 1/1616* (2013.01); *G09G 2320/0285* (2013.01); *G09G 2320/045* (2013.01); *G09G 2320/048* (2013.01); *G09G 2320/0673* (2013.01); *G09G 2360/14* (2013.01); *G09G 2360/145* (2013.01); *G09G 2360/16* (2013.01); *G09G 2380/02* (2013.01)

(58) Field of Classification Search
CPC ............. G09G 3/32; G09G 2320/0285; G09G 2360/14; G09G 2360/16; G09G 2380/02; G09G 2320/045; G09G 2320/048; G09G 2320/0673; G09G 2360/145; G06F 1/1616
See application file for complete search history.

(56) References Cited

U.S. PATENT DOCUMENTS

| 7,675,492 | B2 | 3/2010 | Park et al. | |
| 2021/0158782 | A1* | 5/2021 | Lee | .......................... G09G 5/10 |
| 2022/0101798 | A1* | 3/2022 | Jung | ................... G09G 3/3275 |
| 2023/0070335 | A1* | 3/2023 | Park | ...................... G09G 3/2092 |
| 2024/0144848 | A1* | 5/2024 | Lee | ...................... G09G 3/3233 |

* cited by examiner

*Primary Examiner* — Douglas Wilson
(74) *Attorney, Agent, or Firm* — KILE PARK REED & HOUTTEMAN PLLC

(57) ABSTRACT

An electronic device includes a display panel including a pixel, a sensor that obtains luminance data of an image displayed on the display panel, and a signal controller that receives image data and generates corrected image data based on a compensation value in the image data, wherein the signal controller calculates the compensation value based on initial luminance data and the luminance data.

18 Claims, 14 Drawing Sheets

< ST1 >

< ST2 >

ELECTRONIC DEVICE AND METHOD OF DRIVING ELECTRONIC DEVICE

CROSS-REFERENCE TO RELATED APPLICATION(S)

This application claims priority to and benefits of Korean Patent Application No. 10-2023-0039451 under 35 U.S.C. § 119, filed on Mar. 27, 2023, in the Korean Intellectual Property Office, the entire contents of which are incorporated herein by reference.

BACKGROUND

1. Technical Field

Embodiments relate to an electronic device with an improved image quality and a method of driving the electronic device.

2. Description of the Related Art

An electronic device includes a display panel. The display panel includes an emission type display panel that displays an image by using a light emitting diode that generates light by recombination of electrons and holes. The emission type display panel is advantageous in that power consumption is small and a response speed is fast. The emission type display panel includes pixels connected to data lines and scan lines. Each of the pixels generally includes a light emitting diode, and a pixel circuit for controlling the amount of current flowing through the light emitting diode. When used for a long time, the light emitting diode may be deteriorated and the luminance of the light emitting diode may be lowered. Accordingly, the luminance of the display panel used for a long time may be lower than an initially set luminance.

SUMMARY

Embodiments provide an electronic device capable of improving image quality through compensation in which deterioration variation of a display panel is reflected and a method for driving the electronic device.

However, embodiments of the disclosure are not limited to those set forth herein. The above and other embodiments will become more apparent to one of ordinary skill in the art to which the disclosure pertains by referencing the detailed description of the disclosure given below.

According to an embodiment, an electronic device may include a display panel including a pixel, a sensor that obtains luminance data of an image displayed on the display panel, and a signal controller that receives image data and generates corrected image data based on a compensation value in the image data, wherein the signal controller may calculate the compensation value based on initial luminance data and the luminance data.

The sensor may be a camera module.

The sensor may be an optical fingerprint sensor.

The display panel may be folded and unfolded, the display panel may display the image in case that the display panel is folded, and the luminance data may be obtained in case that the display panel is folded.

The signal controller may include an accumulator that stores a cumulative amount of stress applied to the pixel, a weight calculator that calculates a weight based on the luminance data and the initial luminance data, a lookup table that stores a plurality of intermediate compensation values according to the cumulative amount of the stress, and a compensator that calculates the compensation value based on the plurality of intermediate compensation values and the weight, corrects the image data based on the compensation value, and outputs the corrected image data.

The weight calculator may calculate the weight based on following equations: Panel deterioration amount=(initial luminance data-luminance data)/cumulative amount of stress, and Weight=panel deterioration amount/model average deterioration amount*characteristic coefficient.

The plurality of intermediate compensation values and the model average degradation amount may be values that are obtained from a plurality of test display panels and stored in the signal controller.

The display panel may include a first area overlapping the sensor and a second area not overlapping the sensor, and a transmittance of the first area may be higher than a transmittance of the second area.

The image may be a white image, a red image, a green image, or a blue image. The image may be displayed on a portion of the display panel.

The electronic device may further include an auxiliary instrument unit covering at least a portion of the display panel and including a reflective member.

According to an embodiment, a method of driving an electronic device may include obtaining luminance data by capturing an image displayed by a display panel including pixels by using a sensor, storing a cumulative amount of stress applied to the pixels, calculating a weight based on the luminance data and initial luminance data, calculating a compensation value based on an intermediate compensation value corresponding to the cumulative amount of the stress and the weight, and generating corrected image data based on the compensation value in image data provided to the pixels.

The calculating of the weight may include calculating a panel deterioration amount by subtracting the luminance data from the initial luminance data and dividing the subtracted luminance data by the cumulative amount of the stress, and calculating the weight by dividing the panel deterioration amount by a model average deterioration amount and then multiplying the divided panel deterioration amount by a characteristic coefficient.

The obtaining of the luminance data may include displaying the image on the display panel in case that the display panel is in a folded state, and obtaining the luminance data from the image by using the sensor.

The display panel may include a folding area, a first non-folding area overlapping the sensor, and a second non-folding area spaced apart from the first non-folding area with the folding area disposed between the first non-folding area and the second non-folding area, and the image may be displayed in the second non-folding area.

The compensation value may be updated in case that the display panel is in an off state.

The sensor may be a camera module or an optical fingerprint sensor.

According to an embodiment, an electronic device may include a display panel that includes pixels and is folded and unfolded, a sensor that obtains luminance data of an image displayed on the display panel in case that the display panel is folded, and a signal controller that receives image data and outputs corrected image data based on a compensation value in the image data. The signal controller may include an accumulator that stores a cumulative amount of stress applied to the pixel, a weight calculator that calculates a weight based on the luminance data and initial luminance data, a memory that stores a lookup table in which a plurality of intermediate compensation values according to the cumulative amount of the stress are stored and a model average deterioration amount, and a compensator that calculates the compensation value based on the plurality of intermediate compensation values and the weight, corrects the image data based on the compensation value, and outputs the corrected image data.

The weight calculator may calculate the weight based on following equations: Panel deterioration amount=(initial luminance data-luminance data)/cumulative amount of stress, and Weight=panel deterioration amount/model average deterioration amount*characteristic coefficient.

The display panel may include a folding area, a first non-folding area overlapping the sensor, and a second non-folding area spaced apart from the first non-folding area with the folding area disposed between the first non-folding area and the second non-folding area, and the image may be displayed in the second non-folding area.

The plurality of intermediate compensation values and the model average deterioration amount may be values that are obtained from a plurality of test display panels and stored.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1A:
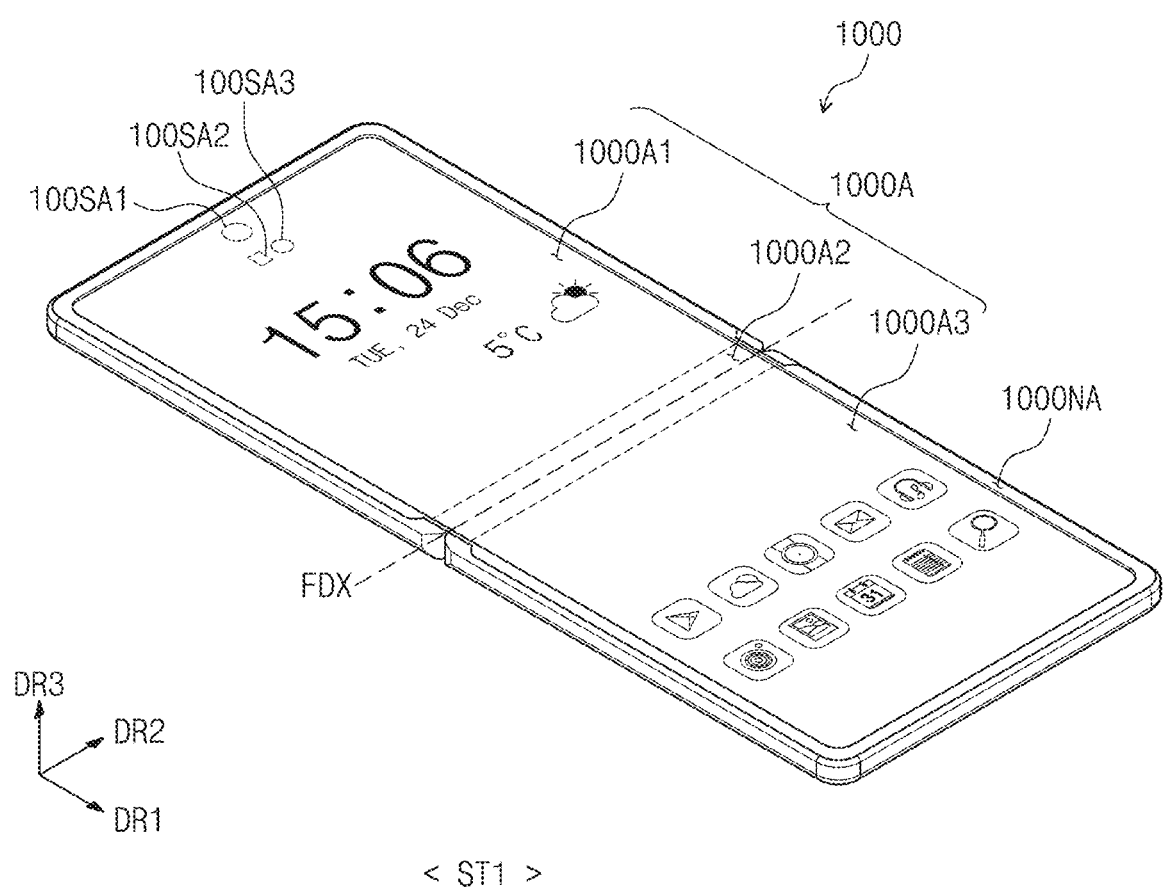
FIG. 1A is a schematic perspective view of an electronic device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, embodiments will be described with reference to accompanying drawings.

Figure 1B:
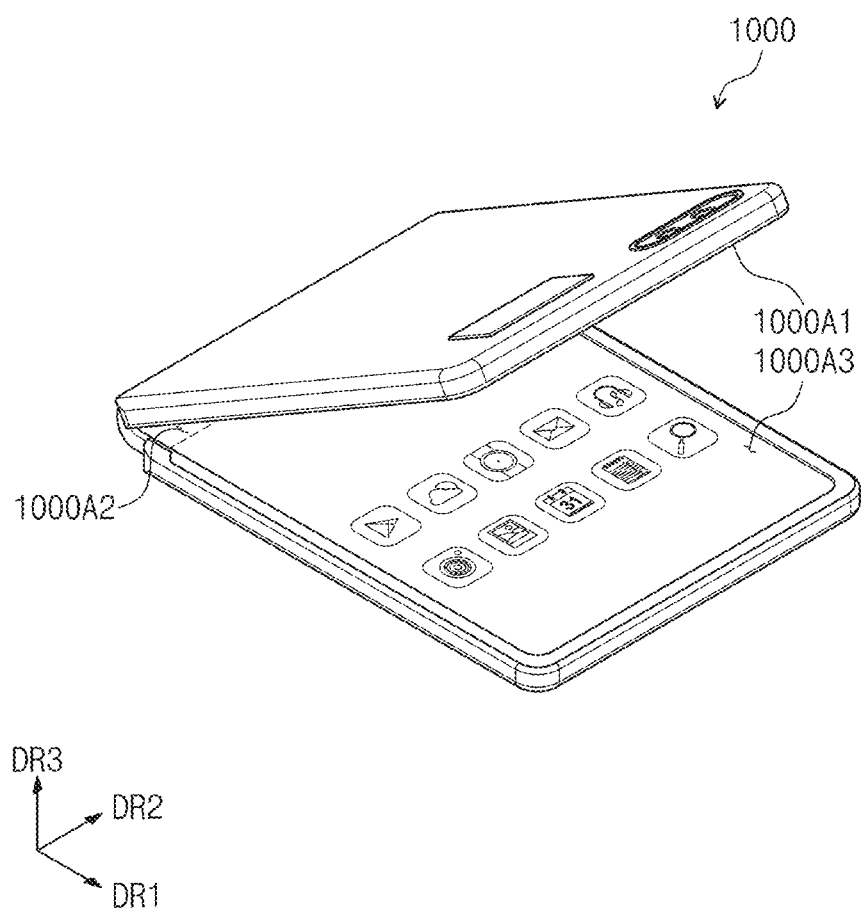
FIG. 1B is a schematic perspective view of an electronic device according to an embodiment.
Figure 1C:
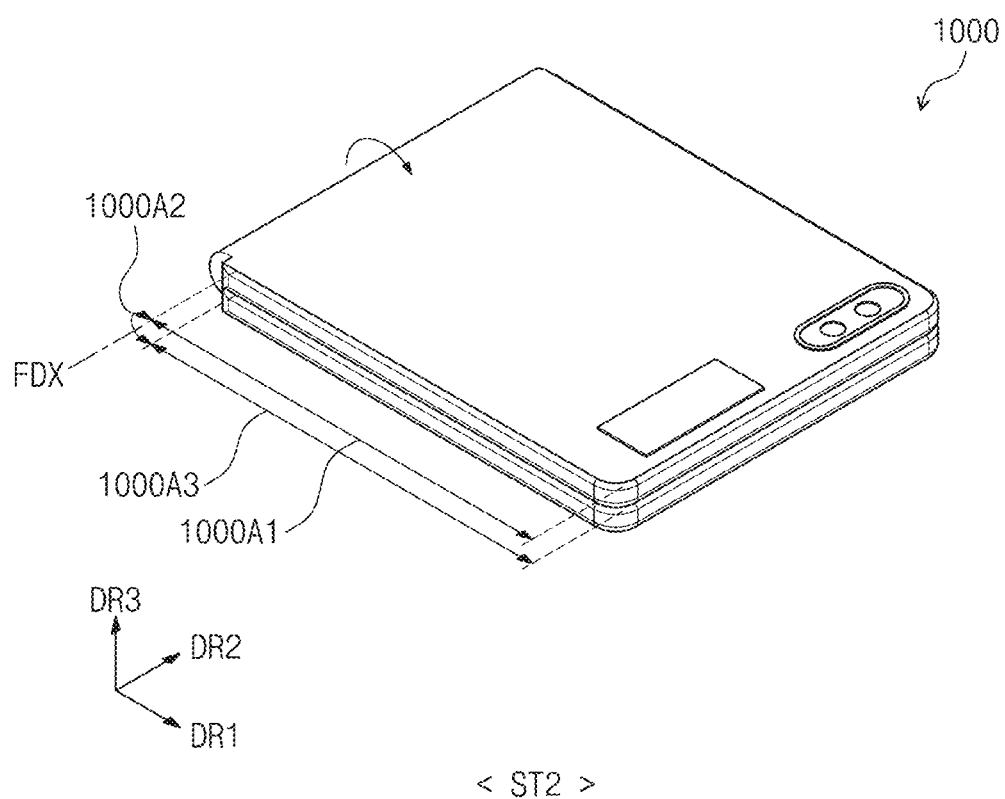
FIG. 1C is a schematic perspective view of an electronic device according to an embodiment.

FIG. 1A is a schematic perspective view illustrating an electronic device 1000 according to an embodiment. FIG. 1B is a schematic perspective view illustrating the electronic device 1000 according to an embodiment. FIG. 1C is a schematic perspective view illustrating the electronic device 1000 according to an embodiment.

FIG. 1A shows a first state ST1 in which the electronic device 1000 is fully unfolded, FIG. 1B shows a state in which the electronic device 1000 is folded, and FIG. 1C shows a second state ST2 in which the electronic device 1000 is fully folded.

Referring to FIGS. 1A, 1B and 1C, the electronic device 1000 may refer to a device that is activated according to an electrical signal. For example, the electronic device 1000 may be a mobile phone, a tablet, a car navigation system, a game console, or a wearable device, but embodiments are not limited thereto. FIG. 1A illustrates that the electronic device 1000 is a mobile phone.

The electronic device 1000 may display an image through an active area 1000A. In the first state ST1 in which the electronic device 1000 is unfolded, the active area 1000A may include a plane defined by a first direction DR1 and a second direction DR2. The thickness direction of the electronic device 1000 may be parallel to a third direction DR3 intersecting the first direction DR1 and the second direction DR2. Accordingly, the front surfaces (or upper surfaces) and the bottom surfaces (or lower surfaces) of the members constituting the electronic device 1000 may be defined based on the third direction DR3.

The active area 1000A may include a first area 1000A1, a second area 1000A2, and a third area 1000A3. The second area 1000A2 may be bent about a folding axis FDX extending in the second direction DR2. Accordingly, the first area 1000A1 and the third area 1000A3 may be referred to as non-folding areas, and the second area 1000A2 may be referred to as a folding area.

In case that the electronic device 1000 is folded, the first area 1000A1 and the third area 1000A3 may face each other. Accordingly, in a state where the electronic device 1000 is fully folded, the active area 1000A may not be exposed to the outside, which is referred to as "in-folding".

FIGS. 1A, 1B, and 1C illustrate that the folding axis FDX is parallel to the minor axis of the electronic device 1000. However, embodiments are not limited thereto. For example, the folding axis FDX may extend in a direction parallel to the major axis of electronic device 1000, for example, the first direction DR1. For example, the first area 1000A1, the second area 1000A2, and the third area 1000A3 may be sequentially arranged in the second direction DR2.

Sensing areas 100SA1, 100SA2, and 100SA3 may be defined in the electronic device 1000. FIG. 1A illustrates the three sensing areas 100SA1, 100SA2, and 100SA3 as an example. However, the number of sensing areas 100SA1, 100SA2, and 100SA3 is not limited thereto. In an embodiment, the second sensing area 100SA2 and the third sensing area 100SA3 may be omitted.

The sensing areas 100SA1, 100SA2, and 100SA3 may include the first sensing area 100SA1, the second sensing area 100SA2, and the third sensing area 100SA3. For example, the first sensing area 100SA1 may overlap a camera module, and the second sensing area 100SA2 and the third sensing area 100SA3 may overlap a proximity illuminance sensor, but embodiments are not limited thereto.

Each of electronic modules 2000 (see FIG. 2) may receive an external input transmitted through the first sensing area 100SA1, the second sensing area 100SA2, or the third sensing area 100SA3, or provide an output through the first sensing area 100SA1, the second sensing area 100SA2, or the third sensing area 100SA3.

In an embodiment, the first sensing area 100SA1, the second sensing area 100SA2, and the third sensing area 100SA3 may be included in the active area 1000A. For example, the first sensing area 100SA1, the second sensing area 100SA2, and the third sensing area 100SA3 may display images. The transmittance of each of the first sensing area 100SA1, the second sensing area 100SA2, and the third sensing area 100SA3 may be higher than the transmittance of a portion of the active area 1000A around the first to third sensing areas 100SA1, 100SA2, and 100SA3. Each of the first sensing area 100SA1, the second sensing area 100SA2, and the third sensing area 100SA3 may be defined as a first area, and a portion of the active area 1000A may be defined as a second area. Accordingly, the transmittance of the first area may be higher than that of the second area.

In an embodiment, the first sensing area 100SA1 may be surrounded by the active area 1000A. For example, the first sensing area 100SA1 may not display an image. For example, the transmittance of the first sensing area 100SA1 may be higher than each of the transmittance of the second sensing area 100SA2 and the transmittance of the third sensing area 100SA3.

According to an embodiment, it is not necessary to provide an area, in which the electronic modules 2000 are to be disposed, in a peripheral area 1000NA around the active area 1000A. As a result, the ratio of the area of the active area 1000A to the entire area of the electronic device 1000 may be increased.

Figure 2:
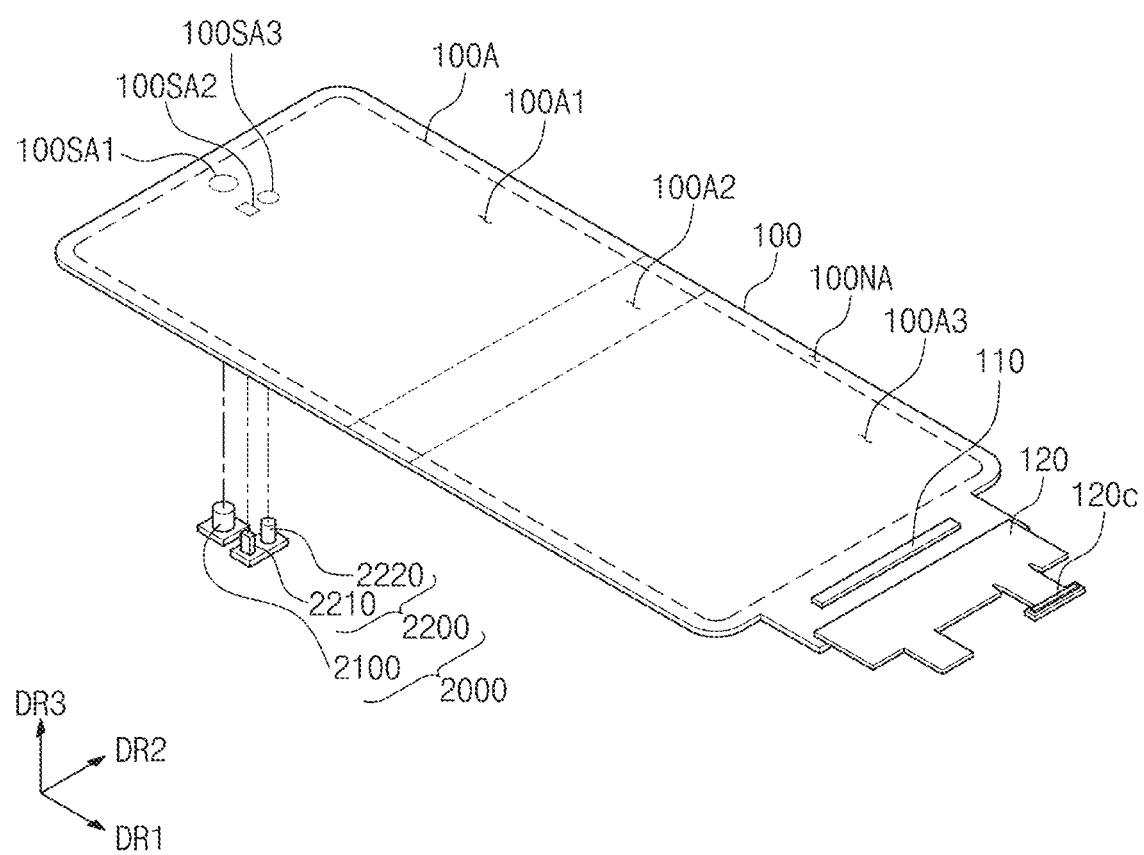
FIG. 2 is an exploded schematic perspective view illustrating some components of an electronic device according to an embodiment.

FIG. 2 is an exploded schematic perspective view illustrating some components of an electronic device according to an embodiment.

Referring to FIG. 2, among components of the electronic device 1000 (see FIG. 1A), a display panel 100, a driving chip 110, a circuit film 120, and the electronic modules 2000 are shown as an example. The electronic modules 2000 may include a camera module 2100 and a proximity illuminance sensor 2200.

The proximity illuminance sensor 2200 may include a light emitting module 2210 and a light receiving module 2220. The light emitting module 2210 and the light receiving module 2220 may be mounted on a substrate. The light emitting module 2210 may generate and output light. For example, the light emitting module 2210 may output infrared light, and the light emitting module 2210 may include a light emitting diode. The light receiving module 2220 may detect infrared light. In case that infrared light having a level (or selectable level) or more is detected, the light receiving module 2220 may be activated. The light receiving module 2220 may include a CMOS sensor. After infrared light being generated by the light emitting module 2210 is output, the infrared light may be reflected by an external object (e.g., a user's finger or face), and then the reflected infrared light may be incident on the light receiving module 2220.

An active area 100A and a peripheral area 100NA may be defined in the display panel 100. The active area 100A may correspond to the active area 1000A shown in FIG. 1A, and the peripheral area 100NA may correspond to the peripheral area 1000NA shown in FIG. 1A. In the description, the expression "an area/portion corresponds to another area/portion" means that an area/portion overlaps another area/portion and does not mean that the areas/portions have the same area.

The first sensing area 100SA1 overlapping the camera module 2100, the second sensing area 100SA2 overlapping the light emitting module 2210, and the third sensing area 100SA3 overlapping the light receiving module 2220 may be portions of the active area 100A. However, embodiments are not limited thereto. For example, the first sensing area 100SA1 overlapping the camera module 2100 may be surrounded by the active area 100A, and correspondingly, a hole from which a portion of the display panel 100 is removed may be defined in the display panel 100.

A first area 100A1, a second area 100A2, and a third area 100A3 may be sequentially defined in the display panel 100 along the first direction DR1. The second area 100A2 may be a foldable area around the folding axis FDX (see FIG. 1A). The first to third areas 100A1, 100A2, and 100A3 may overlap or correspond to the first area 1000A1, the second area 1000A2, and the third area 1000A3 shown in FIG. 1A, respectively. The first area 100A1 may be referred to as a first non-folding area, the second area 100A2 may be referred to as a folding area, and the third area 100A3 may be referred to as a second non-folding area.

The driving chip 110 may be mounted on the peripheral area 100NA of the display panel 100 and the circuit film 120 may be attached thereto.

The driving chip 110 may be a timing control circuit in the form of a chip. The driving chip 110 may be referred to as a display driver 1C. However, this is merely an example, and the driving chip 110 may be mounted on a film, which is separated from the display panel 100. For example, the driving chip 110 may be electrically connected to the display panel 100 through the film, and the circuit film 120 may be attached to the film.

A connector 120c that receives a signal provided from a central processing unit embedded in the electronic device 1000 (see FIG. 1A) may be disposed on the circuit film 120. The circuit film 120 may be connected to the peripheral area 100NA adjacent to the third area 100A3.

Figure 3:
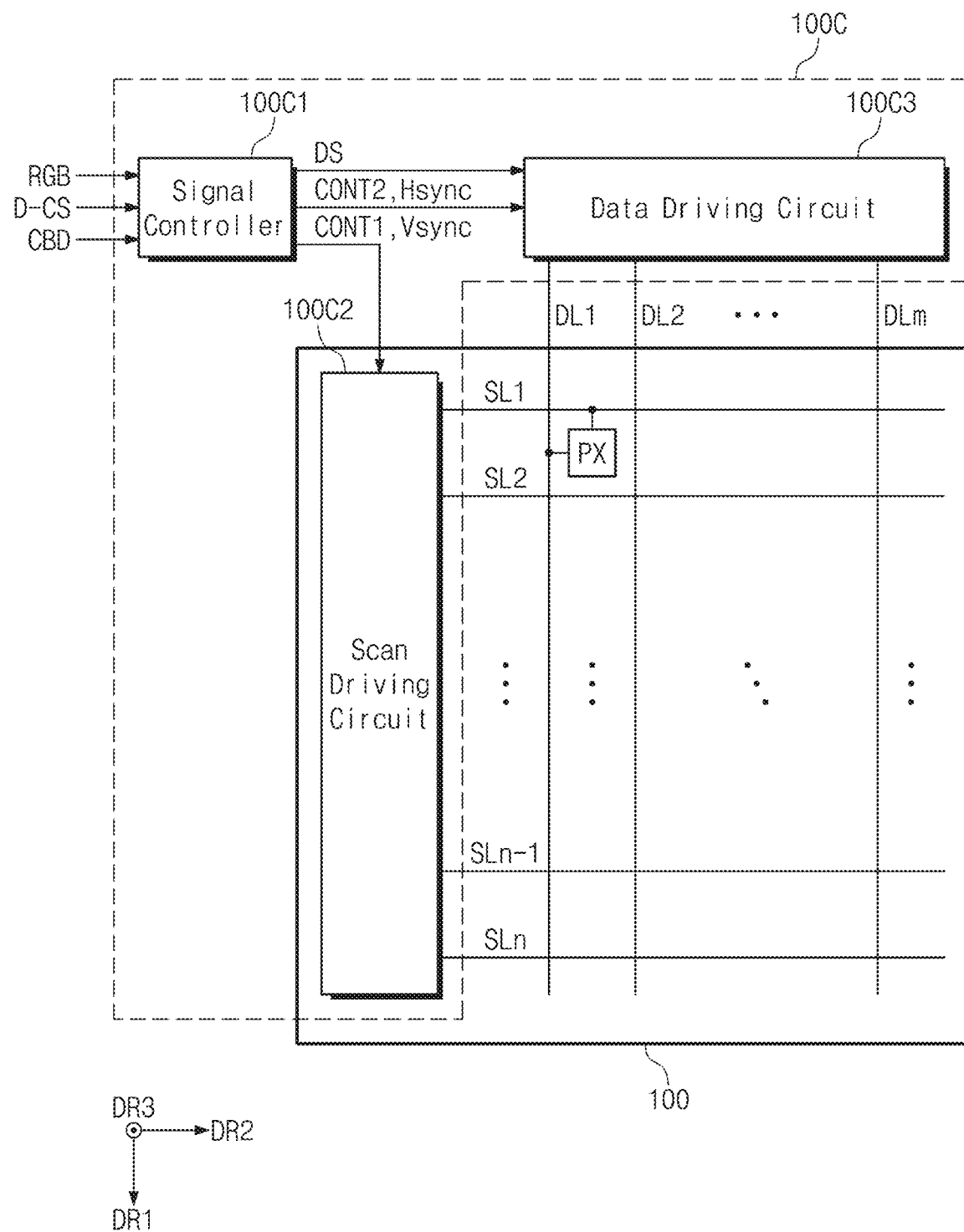
FIG. 3 is a block diagram illustrating a display panel and a display driver according to an embodiment.

FIG. 3 is a block diagram of the display panel 100 and a display driver 100C according to an embodiment.

Referring to FIG. 3, the display panel 100 may include scan lines SL1 to SLn, data lines DL1 to DLm, and pixels PX. Each of the pixels PX may be connected with a corresponding data line of the data lines DL1 to DLm and may be connected with a corresponding scan line of the scan lines SL1 to SLn. "n" may be an integer of 2 or more, "m" may be an integer of 2 or more. In an embodiment, the display panel 100 may further include emission control lines, and the display driver 100C may further include an emission driving circuit that provides control signals to the emission control lines. A configuration of the display panel 100 is not limited.

Each of the data lines DL1 to DLm may extend in the first direction DR1, and the data lines DL1 to DLm may be arranged to be spaced apart from each other in the second direction DR2. Each of the scan lines SL1 to SLn may extend in the second direction DR2, and the scan lines SL1 to SLn may be arranged to be spaced apart from each other in the first direction DR1.

The display driver 100C may include a signal controller 100C1, a scan driving circuit 100C2, and a data driving circuit 100C3.

The signal controller 100C1 may receive image data RGB and a control signal D-CS from a main driver. The control signal D-CS may include various signals. For example, the control signal D-CS may include an input vertical synchronization signal, an input horizontal synchronization signal, a main clock, a data enable signal, and the like.

The signal controller 100C1 may generate a first control signal CONT1 and a vertical synchronization signal Vsync based on the control signal D-CS and may output the first control signal CONT1 and the vertical synchronization signal Vsync to the scan driving circuit 100C2.

The signal controller 100C1 may generate a second control signal CONT2 and a horizontal synchronization signal Hsync based on the control signal D-CS and output the second control signal CONT2 and the horizontal synchronization signal Hsync to the data driving circuit 100C3.

In an embodiment, the signal controller 100C1 may receive luminance data CBD from the camera module 2100 (see FIG. 2). The signal controller 100C1 may generate corrected image data RGBc (see FIG. 5) in which a compensation value is reflected in the image data RGB. The compensation value may be calculated based on an initial luminance data IBD (see FIG. 5) and the luminance data CBD. The luminance data CBD may be obtained by measuring the luminance of an image displayed on the display panel 100. Detailed description thereof will be given later.

The signal controller 100C1 may output a driving signal DS obtained/generated by processing the corrected image data RGBc so as to comply with an operating condition of the display panel 100, to the data driving circuit 100C3. The first control signal CONT1 and the second control signal CONT2 that are signals necessary for operations of the scan driving circuit 100C2 and the data driving circuit 100C3 are not limited.

The scan driving circuit 100C2 may drive the scan lines SL1 to SLn in response to the first control signal CONT1 and the vertical synchronization signal Vsync. In an embodiment, the scan driving circuit 100C2 may be mounted in the display panel 100. For example, the scan driving circuit 100C2 may be formed by the same process as the transistors of the pixels PX, but embodiments are not limited thereto. For example, after being implemented as an integrated circuit (IC), the scan driving circuit 100C2 may be mounted (e.g., directly mounted) in a certain area of the display panel 100 or mounted on a separate printed circuit board in a chip on film (COF) scheme, and then may be electrically connected to the display panel 100.

The data driving circuit 100C3 may output gray scale voltages to the data lines DL1 to DLm in response to the second control signal CONT2, the horizontal synchronization signal Hsync, and the driving signal DS from the signal controller 100C1. The data driving circuit 100C3 may be included in the driving chip 110 (see FIG. 2). For example, after being implemented as 1C, the data driving circuit 100C3 may be mounted (e.g., directly mounted) in a certain area of the display panel 100 or mounted on a separate printed circuit board in a chip on film (COF) scheme, and then may be electrically connected to the display panel 100, but embodiments are not limited thereto. For example, the data driving circuit 100C3 and a circuit layer in the display panel 100 may be formed by the same process.

Figure 4:
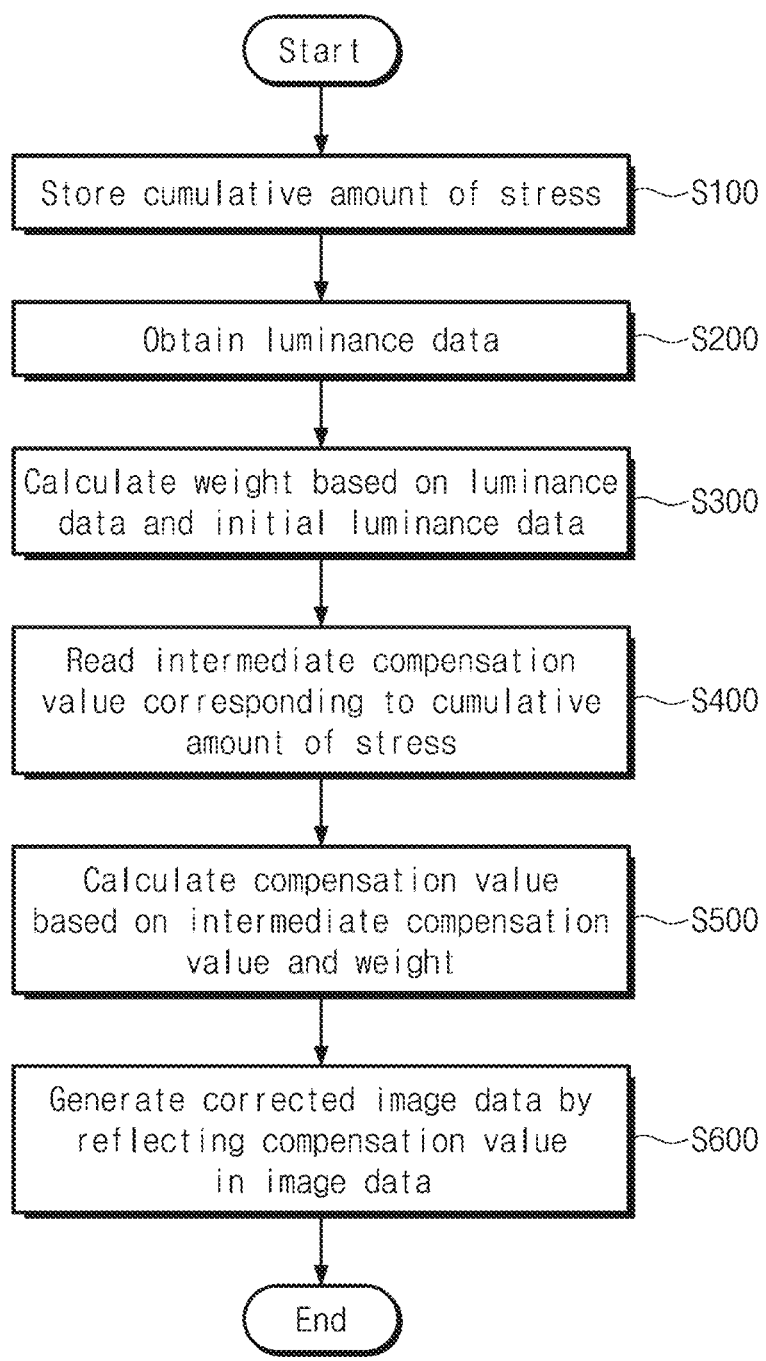
FIG. 4 is a flowchart for describing a compensation operation according to an embodiment.
Figure 5:
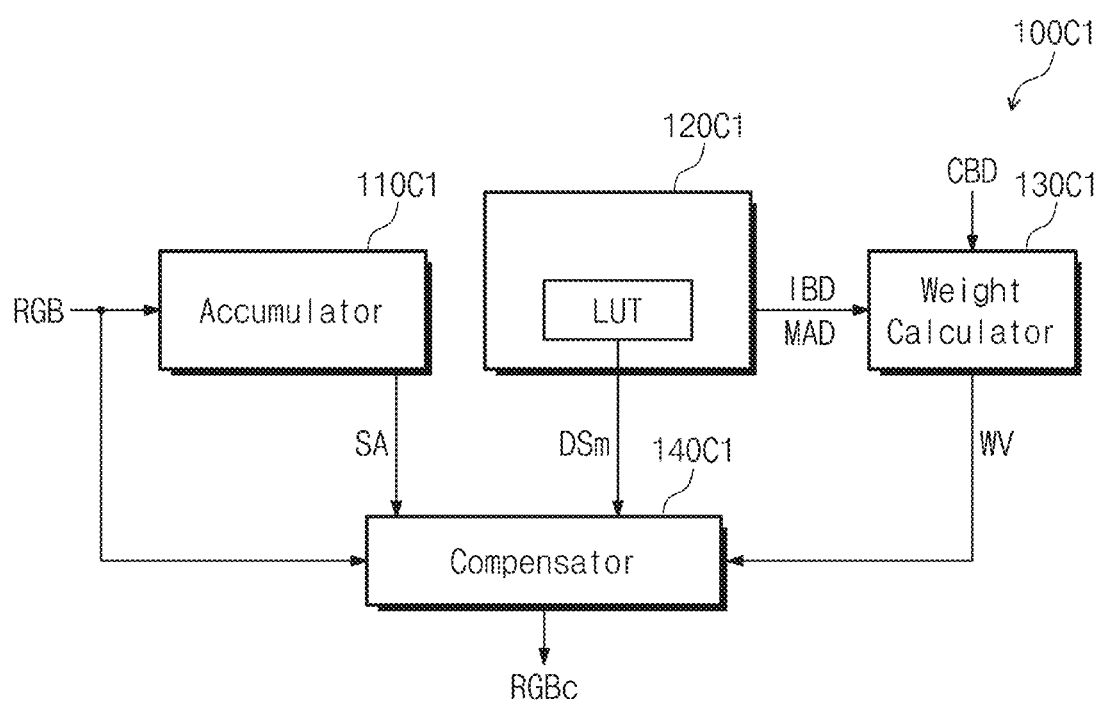
FIG. 5 is a block diagram of a signal controller according to an embodiment.

FIG. 4 is a flowchart for describing a compensation operation according to an embodiment. FIG. 5 is a block diagram of the signal controller 100C1 according to an embodiment.

Referring to FIGS. 3, 4, and 5, the signal controller 100C1 may receive the image data RGB and generate the corrected image data RGBc by applying a compensation value to the image data RGB. For example, the signal controller 100C1 may calculate the compensation value based on the initial luminance data IBD and the luminance data CBD. In this regard, the description will be given below.

The signal controller 100C1 may include an accumulator 110C1, a memory 120C1, a weight calculator 130C1, and a compensator 140C1.

The accumulator 110C1 may store a cumulative amount of stress SA applied to each of the pixels PX (S100). The cumulative amount of the stress SA may be data used to determine the degree of deterioration of each of the pixels PX. For example, a data cumulative value may be generated based on the image data RGB input to the pixels PX, and the cumulative amount of the stress SA may be calculated based on the generated data cumulative value. The pixels PX may include a red pixel, a green pixel, and a blue pixel. Since the red, green, and blue pixels are formed of different materials, the degrees of deterioration thereof may be different from each other. Accordingly, the cumulative amount of the stress SA may be stored for each of the pixels PX.

The memory 120C1 may store information on a lookup table LUT, the initial luminance data IBD, and model average degradation amount MAD. Intermediate compensation values DSm according to the cumulative amount of the stress SA may be stored in the lookup table LUT. The intermediate compensation values DSm and the model average degradation amount MAD may be values obtained from test display panels and stored in the memory 120C1.

The weight calculator 130C1 may receive the initial luminance data IBD, the luminance data CBD, and the model average degradation amount MAD.

In an embodiment, the luminance data CBD may be obtained from the camera module 2100 (S200) (see FIG. 2). For example, the luminance data CBD may be obtained by measuring the luminance of an image displayed on the display panel 100.

The weight calculator 130C1 may calculate a weight WV based on the luminance data CBD and the initial luminance data IBD (S300). The initial luminance data IBD may be data measured and stored in the second state ST2 (see FIG. 1C) before shipment of the electronic device 1000 (see FIG. 1C). It may be noted that this is only an example, and the initial luminance data IBD may be basic data which is arbitrarily determined.

The weight calculator 130C1 may calculate the weight WV based on the following equations.

$$\text{panel deterioration amount} = \text{(initial luminance data} - \text{luminance data)} / \text{cumulative amount of stress} \qquad \text{Equation 1}$$

$$\text{weight} = \text{panel deterioration amount} / \text{model average deterioration amount} * \text{characteristic coefficient} \qquad \text{Equation 2}$$

The characteristic coefficient may be a coefficient that changes according to a product to which the display panel 100 is applied. For example, in case that the display panel 100 is applied to a mobile phone, the characteristic coefficient may be 1, and in case that the display panel 100 is applied to a tablet, the characteristic coefficient may be 2. This is only described as an example, and the characteristic coefficient is not limited to the above example, and may be changed according to products.

The compensator 140C1 may read the intermediate compensation value DSm corresponding to the cumulative amount of the stress SA from the lookup table LUT (S400). The compensator 140C1 may calculate a compensation value based on the intermediate compensation value DSm and the weight WV (S500). For example, the compensation value may be calculated by multiplying the intermediate compensation value DSm by the weight WV. Thereafter, the compensator 140C1 may generate the corrected image data RGBc by reflecting (or based on) the compensation value in the image data RGB (S600).

In an embodiment, the compensation value may be updated in case that the display panel 100 does not display an image. For example, in case that the compensation value is updated while the display panel 100 is displaying an image, a user may recognize a change in luminance. Therefore, to prevent the above issue, the compensation value may be updated in case that the display panel 100 is in an off state.

Figure 6A:
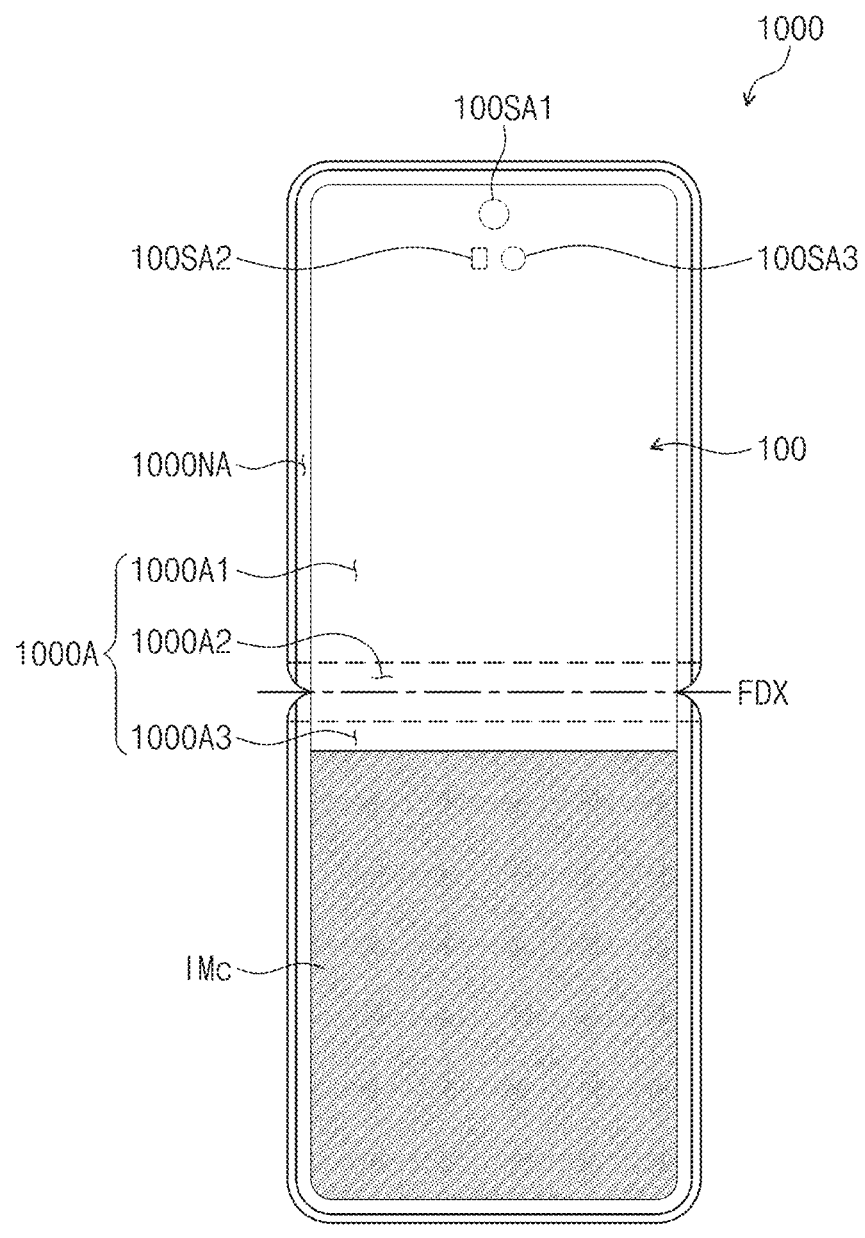
FIG. 6A is a schematic plan view of the electronic device for describing operation of a display panel according to an embodiment.

FIG. 6A is a schematic plan view of the electronic device 1000 for describing operation of the display panel 100 according to an embodiment.

Referring to FIGS. 1C and 6A, in case that the electronic device 1000 is in the second state ST2, an image IMc may be displayed on the display panel 100. In FIG. 6A, the electronic device 1000 is shown in an unfolded state for description.

Obtaining luminance data CBD (S200, see FIGS. 4 and 5) may include displaying the image IMc on the display panel 100 in a folded state of the display panel 100, and obtaining the luminance data CBD by using the camera module 2100 (see FIG. 2).

A period in which the luminance data CBD is obtained may be set in various ways. For example, the luminance data CBD may be obtained based on the cumulative use time of the electronic device 1000. For example, in case that the cumulative use time has reached 500 hours, the luminance data CBD may be obtained. However, embodiments are not limited thereto. For example, a period in which the luminance data CBD is obtained may be a period of three months or a period of one year, or variously changed, for example, in case that a user's specific operation (e.g., turning off/on the electronic device) occurs.

The image IMc may be displayed on a portion of the display panel 100. For example, the image IMc may be displayed on an area facing the camera module 2100, e.g., an area facing the first sensing area 100SA1. For example, the image IMc may be displayed on the third area 100A3.

The image IMc may be a white image, a red image, a green image, or a blue image, but embodiments are not limited thereto. For example, the image IMc may be the same image of an image used in case that the initial luminance data IBD (see FIG. 5) is obtained.

Figure 6B:
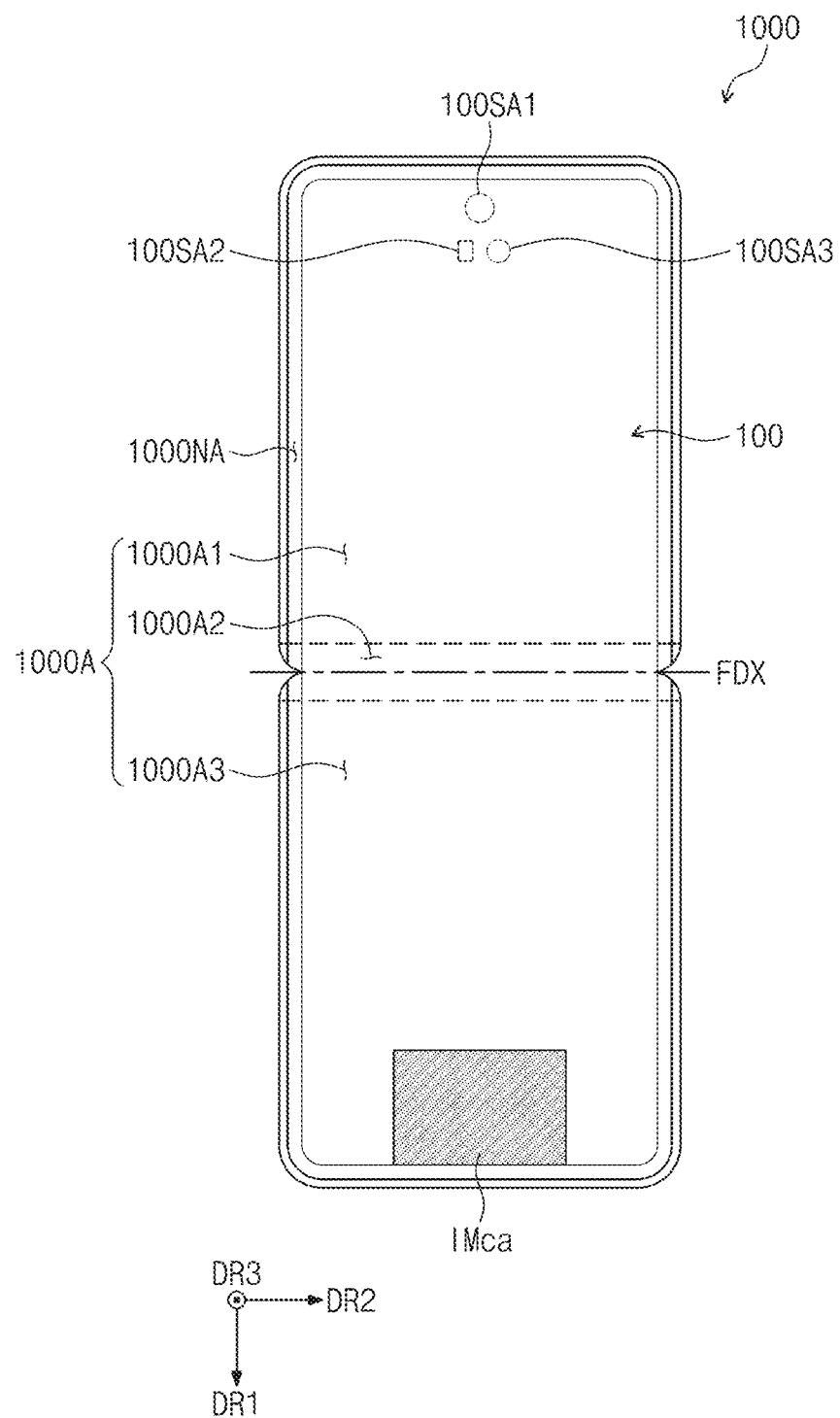
FIG. 6B is a schematic plan view of the electronic device for describing operation of the display panel.

FIG. 6B is a schematic plan view of the electronic device 1000 for describing operation of the display panel 100 according to an embodiment. In the description of FIG. 6B, a difference with FIG. 6A will be described, and the same components are marked by the same reference numerals, and thus, additional description will be omitted to avoid redundancy.

Referring to FIGS. 1C and 6B, an image IMca may be displayed on an area facing the camera module 2100 (see FIG. 2), e.g., an area facing the first sensing area 100SA1. In case that the electronic device 1000 is in the second state ST2, the image IMca may be displayed on the display panel 100, and the image IMca may be displayed only in a partial area spaced apart from the peripheral area 1000NA, so that a user may not recognize that the image IMca is displayed.

Figure 7:
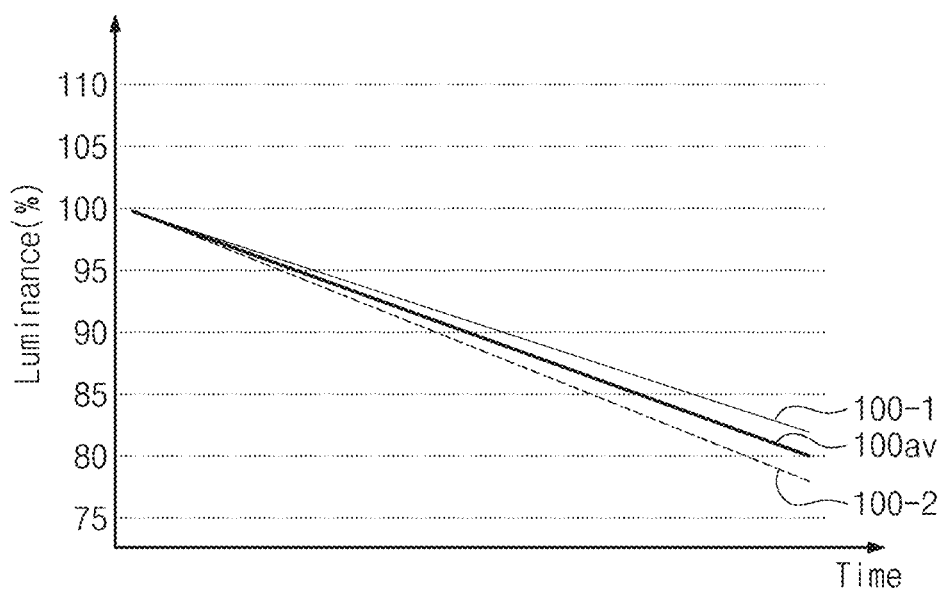
FIG. 7 shows graphs illustrating deterioration amounts of display panels over time according to an embodiment.
Figure 8:
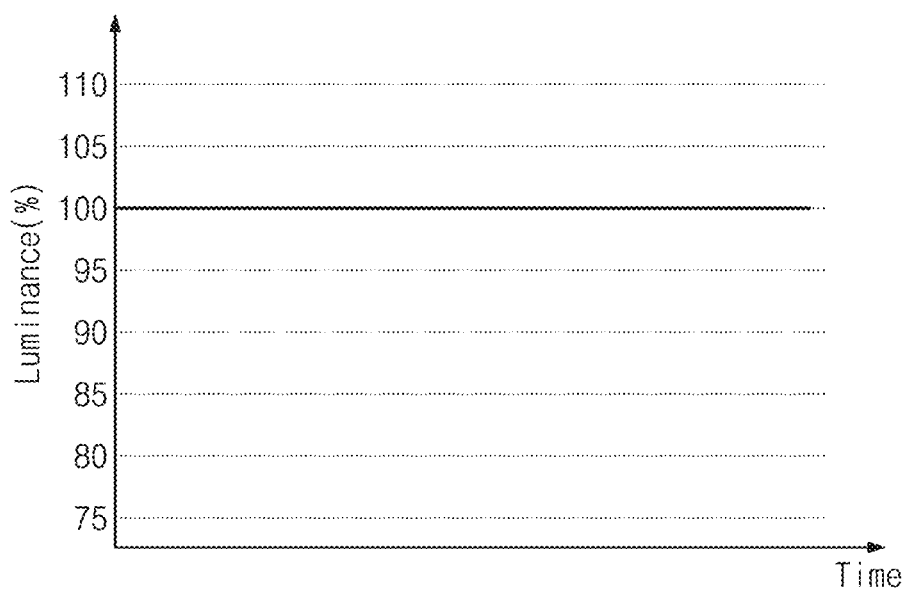
FIG. 8 shows graphs illustrating luminance of compensated display panels over time according to an embodiment.

FIG. 7 are graphs illustrating deterioration amounts of display panels over time according to an embodiment. FIG. 8 are graphs illustrating luminance of compensated display panels over time according to an embodiment.

FIGS. 7 and 8 show graphs illustrating deterioration amounts of a first display panel 100-1, a second display panel 100-2, and a third display panel 100-av of the same model over time. As illustrated in FIGS. 7 and 8, the luminance of the first to third display panels 100-1, 100-2, and 100-av may decrease below the initial luminance over time. The third display panel 100-av may be a display panel having an average deterioration amount over time.

In spite of the same model, a difference in deterioration amount may occur due to manufacturing variation, as shown in FIG. 7. For example, in case that the image data is compensated based on the average value, appropriate compensation may be performed for the third display panel 100-av. However, in the case of the first display panel 100-1, overcompensation (or compensation with a luminance higher than the initial luminance) may be performed, and in the case of the second display panel 100-2, weak compensation (or compensation with a luminance lower than the initial luminance) may be performed.

However, according to an embodiment, the signal controller 100C1 (see FIG. 5) may obtain luminance data from the display panel 100-1, 100-2, or 100-av, and calculate the panel deterioration amount of a target display panel 100-1, 100-2 or 100-av based on the luminance data. Thereafter, a weight may be calculated based on the panel degradation amount and the model average deterioration amount, and an image data may be compensated with a compensation value reflecting the weight. Accordingly, because the image data is compensated with the compensation value in which the weight is reflected in case that there is a deviation in deterioration amount, the first to third display panels 100-1, 100-2, and 100-av may be all compensated accurately (e.g., compensated with substantially the same level as the initial luminance) as shown in FIG. 8. Accordingly, the accuracy of compensation may be improved, and accordingly, the image quality of the electronic device 1000 may be improved.

Figure 9:
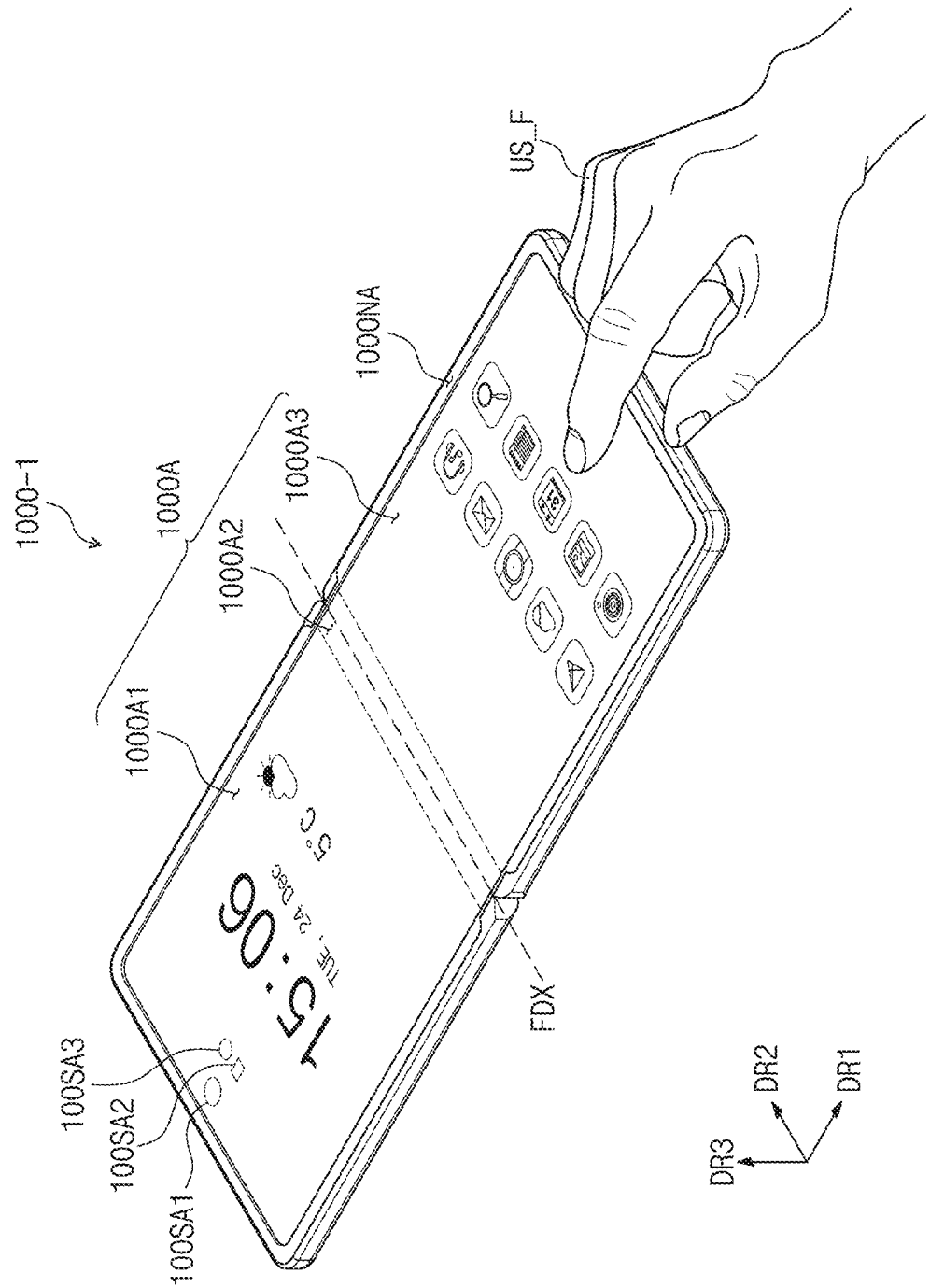
FIG. 9 is a schematic perspective view of an electronic device according to an embodiment.

FIG. 9 is a schematic perspective view of an electronic device 1000-1 according to an embodiment.

Referring to FIG. 9, the electronic device 1000-1 may detect biometric information of a user US_F provided from the outside or measure brightness. For example, the electronic device 1000-1 may include a sensor that detects light reflected by a user's fingerprint or responds to light.

According to an embodiment, luminance data may be obtained from the electronic device 1000-1 by using a sensor that senses a fingerprint, and a compensation value may be generated based on the luminance data to compensate the image data RGB. Accordingly, the accuracy of compensation may be improved, and accordingly, the image quality of the electronic device 1000-1 may be improved.

The signal controller 100C1 may generate the corrected image data RGBc (see FIG. 5) in which a compensation value is reflected in the image data RGB. The compensation value may be calculated based on the initial luminance data IBD (see FIG. 5) and the luminance data CBD.

Figure 10A:
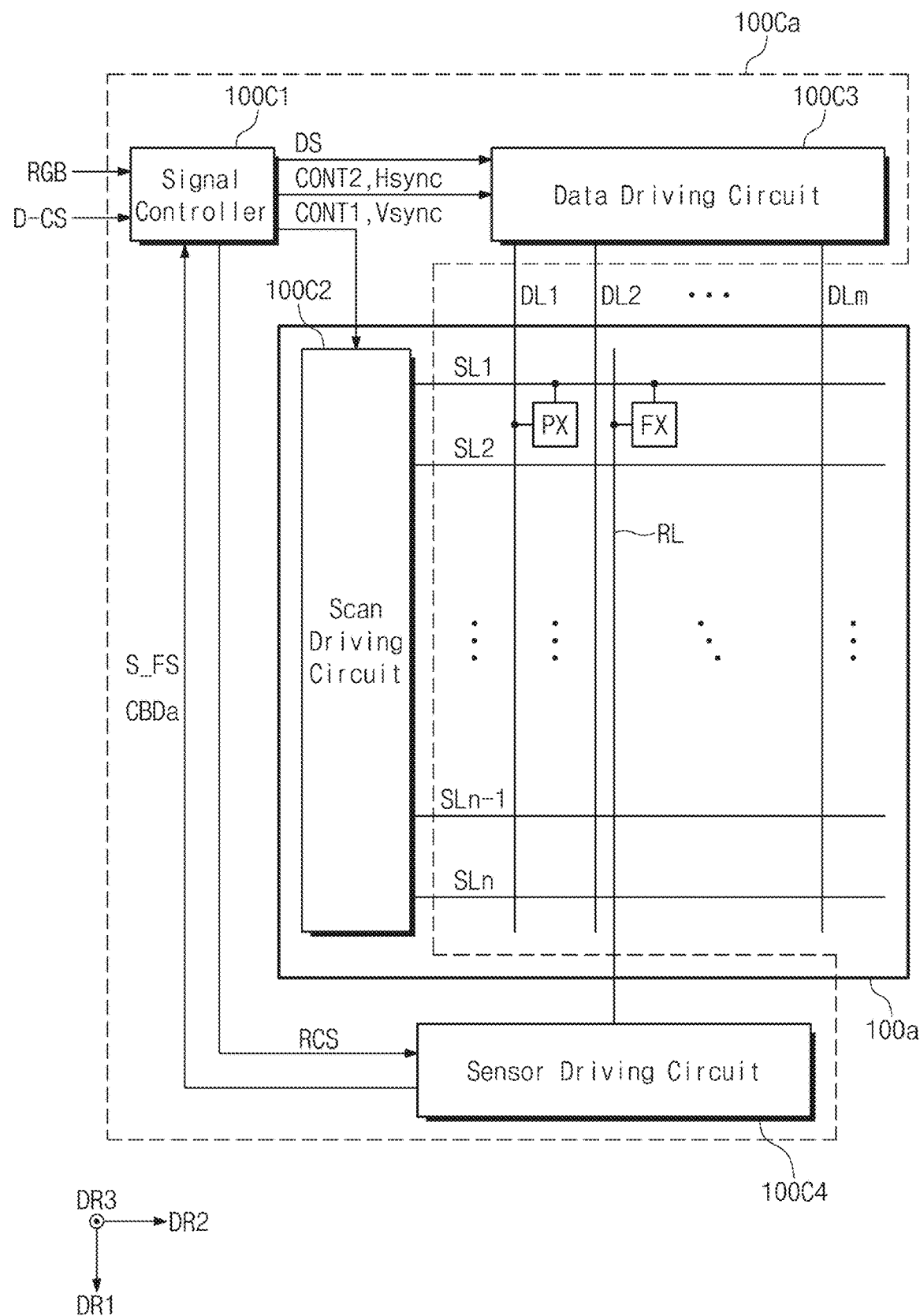
FIG. 10A is a block diagram of the display panel and the display driver according to an embodiment.

FIG. 10A is a block diagram of the display panel 100a and a display driver 100Ca according to an embodiment. In the description of FIG. 10A, a difference with FIG. 3 will be described, and the same components are marked by the same reference numerals, and thus, additional description will be omitted to avoid redundancy.

Referring to FIG. 10A, the display panel 100a may further include a light sensing element FX. The display panel 100a may further include a readout line RL electrically connected to the light sensing element FX. FIG. 10A representatively shows one light sensing element FX and one readout line RL, but the display panel 100a may include light-sensing elements and read-out lines.

The light sensing element FX may be a photodiode. As an example, the light sensing element FX may be an organic photodiode including an organic material as a photoelectric conversion layer, but embodiments are not limited thereto. The light sensing element FX may be exposed to light during an emission period of the pixel PX. The light sensing element FX may obtain user's fingerprint information through a change in electric field.

The display driver 100Ca may further include a sensor driving circuit 100C4. The sensor driving circuit 100C4 may receive a third control signal RCS from the signal controller 100C1. The sensor driving circuit 100C4 may receive sensing signals from the readout line RL in response to the third control signal RCS. The sensor driving circuit 100C4 may process the sensing signals received from the readout lines RL and provide a processed sensing signals S_FS to the signal controller 100C1.

According to an embodiment, as shown in FIG. 1C, the light sensing element FX may obtain luminance data CBDa from an image displayed on the display panel 100a in case that the electronic device 1000-1 is fully folded. The signal controller 100C1 may calculate a compensation value based on the initial luminance data IBD (see FIG. 5) and the luminance data CBDa. A specific description thereof has been given with reference to FIGS. 4 and 5.

According to the disclosure, in case that the degree of deterioration of the display panel 100a is different from an average value, a weight may be calculated based on the panel deterioration amount and the model average deterioration amount, and image data may be compensated with a compensation value reflecting the weight. Accordingly, the accuracy of compensation may be improved, and accordingly, the image quality of the electronic device 1000-1 may be improved.

Figure 10B:
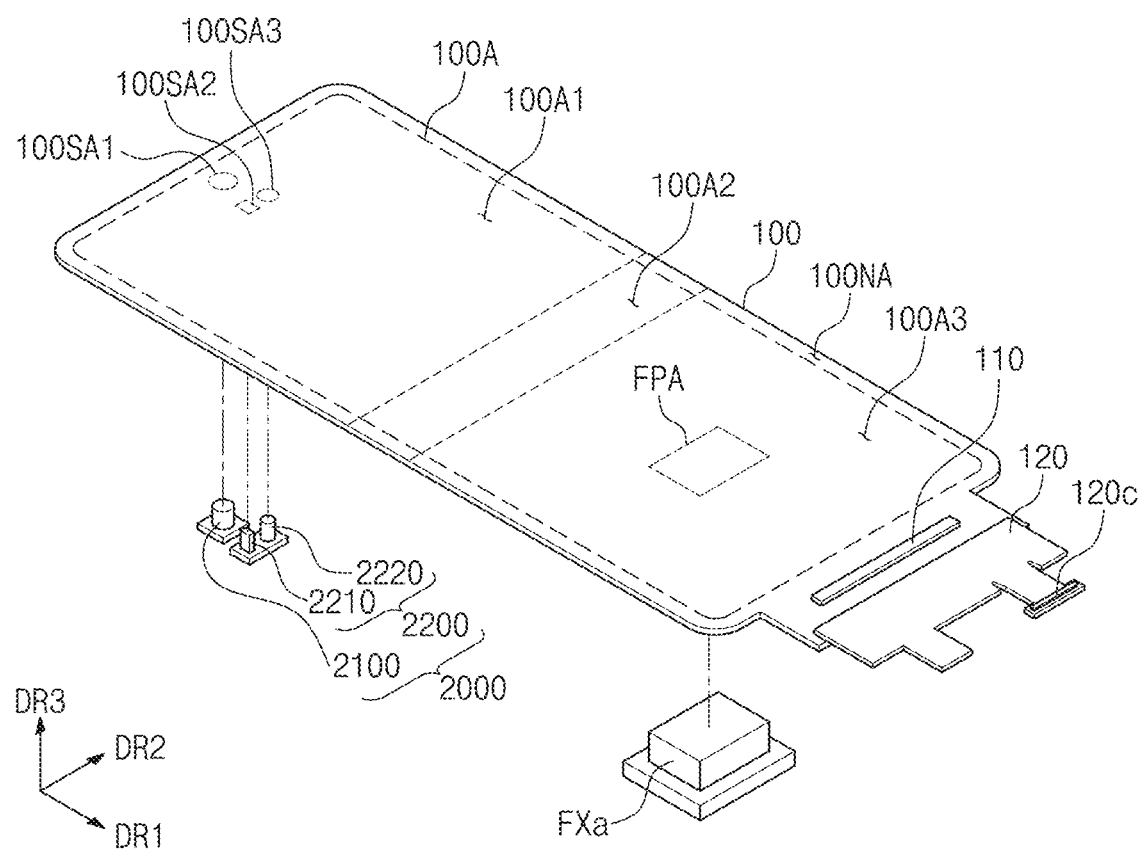
FIG. 10B is an exploded schematic perspective view illustrating some components of an electronic device according to an embodiment.

FIG. 10B is an exploded schematic perspective view illustrating some components of an electronic device according to an embodiment.

Referring to FIG. 10B, among components of the electronic device 1000-1 (see FIG. 9), the display panel 100 and a fingerprint sensor FXa may be included.

The fingerprint sensor FXa may be disposed under the display panel 100. The fingerprint sensor FXa may be an optical sensor that senses (or responds to) light reflected by a user's fingerprint. A portion of the display panel 100 overlapping the fingerprint sensor FXa may be defined as a fingerprint sensing area FPA.

According to an embodiment, as shown in FIG. 1C, the fingerprint sensor FXa may obtain the luminance data CBD (see FIG. 5) from an image displayed on the display panel 100 in case that the electronic device 1000-1 is fully folded. In the embodiment shown in FIG. 10B, an image for obtaining luminance may be displayed on the first area 100A1 because the fingerprint sensor FXa overlaps the third area 100A3.

The signal controller 100C1 may calculate a compensation value based on the initial luminance data IBD (see FIG. 5) and the luminance data CBD. A specific description thereof has been given with reference to FIGS. 4 and 5.

According to the disclosure, in case that the degree of deterioration of the display panel 100 is different from an average value, a weight may be calculated based on the panel deterioration amount and the model average deterioration amount, and image data may be compensated with a compensation value reflecting the weight. Accordingly, the accuracy of compensation may be improved, and accordingly, the image quality of the electronic device 1000-1 may be improved.

Figure 11:
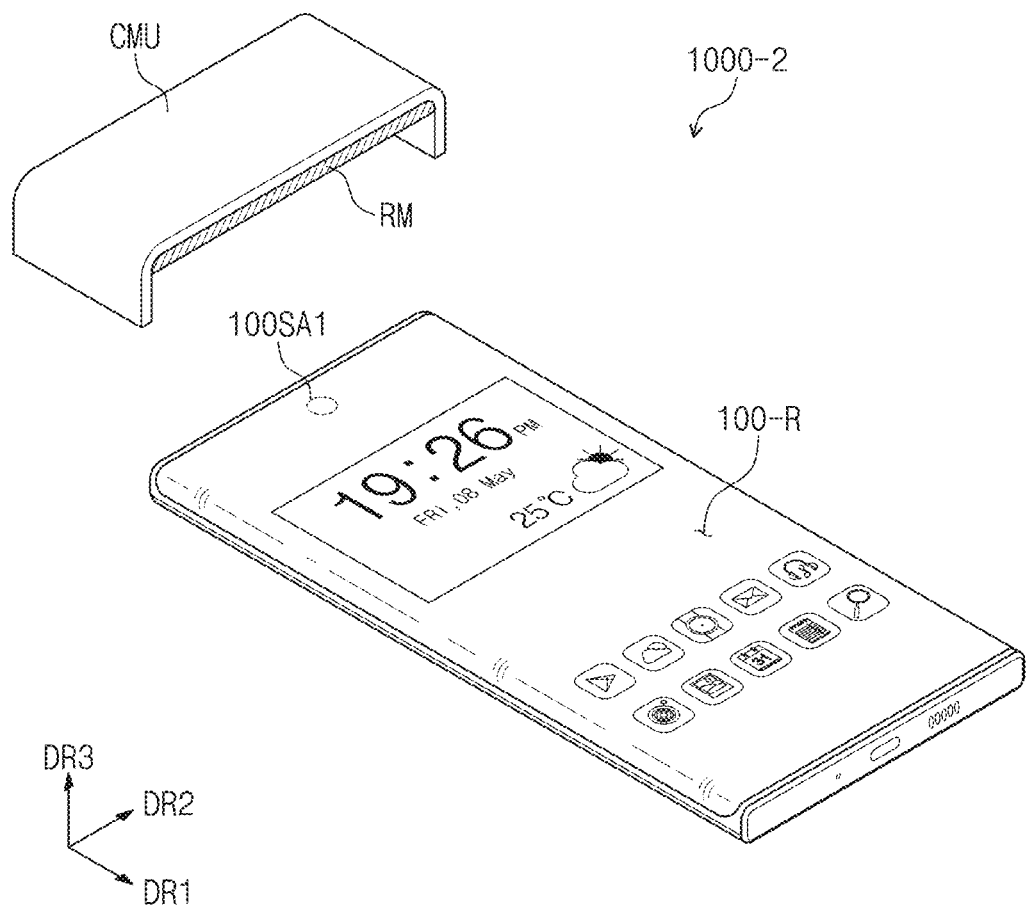
FIG. 11 is a schematic diagram illustrating an electronic device including an auxiliary instrument unit according to an embodiment.

FIG. 11 is a schematic diagram illustrating an electronic device 1000-2 including an auxiliary instrument unit CMU according to an embodiment.

Referring to FIGS. 5 and 11, an electronic device 1000-2 may include a display panel 100-R and an auxiliary instrument unit CMU. The display panel 100-R may be included in a bar-type device. For example, the display panel 100-R may not be folded. In an embodiment, because the display panel 100-R is not folded, the separate auxiliary instrument unit CMU may be utilized to obtain the luminance data CBD for compensating for the image data RGB.

In FIG. 11, an example of the auxiliary instrument unit CMU is shown as an example. The auxiliary instrument unit CMU may cover at least a portion of the display panel 100-R and may have a reflective member RM attached thereto. The reflective member RM may be a mirror, but embodiments are not limited thereto.

The display panel 100-R covered by the auxiliary instrument unit CMU may display an image in an area adjacent to or including the first sensing area 100SA1. For example, the camera module 2100 (see FIG. 2) disposed overlapping the first sensing area 100SA1 may obtain the luminance data CBD by measuring the luminance of an image reflected by the auxiliary instrument unit CMU. The signal controller 100C1 may calculate a compensation value based on the initial luminance data IBD and the luminance data CBD. A specific description thereof has been given with reference to FIGS. 4 and 5.

As described above, the signal controller may obtain luminance data from a display panel and may calculate a panel deterioration amount of the display panel to be compensated for based on the luminance data. Thereafter, a weight may be calculated based on the panel degradation amount and the model average degradation amount, and the image data may be compensated with a compensation value reflecting the weight. Therefore, image data may be compensated with a compensation value in which the weight is reflected in case that there is a variation in the degradation amount of each display panel, thereby improving the accuracy of compensation. Accordingly, the image quality of the electronic device may be enhanced.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:
1. An electronic device comprising:
   a display panel including a pixel;
   a sensor that obtains luminance data of an image displayed on the display panel;

and a signal controller that receives image data and
generates corrected image data based on a compensation value in the image data, wherein
the signal controller calculates the compensation value based on initial luminance data and the luminance data, and wherein the signal controller includes:
an accumulator that stores a cumulative amount of stress applied to the pixel;
a weight calculator that calculates a weight based on the luminance data and the initial luminance data;
a lookup table that stores a plurality of intermediate compensation values according to the cumulative amount of the stress; and
a compensator that calculates the compensation value based on the plurality of intermediate compensation values and the weight, corrects the image data based on the compensation value, and outputs the corrected image data.

2. The electronic device of claim 1, wherein the sensor is a camera module.

3. The electronic device of claim 1, wherein the sensor is an optical fingerprint sensor.

4. The electronic device of claim 1, wherein the weight calculator calculates the weight based on following equations:

Panel deterioration amount=(initial luminance data−luminance data)/cumulative amount of stress, and Weight=panel deterioration amount/model average deterioration amount*characteristic coefficient.

5. The electronic device of claim 4, wherein the plurality of intermediate compensation values and the model average degradation amount are values that are obtained from a plurality of test display panels and stored in the signal controller.

6. The electronic device of claim 1, wherein
the display panel includes:
a first area overlapping the sensor, and
a second area not overlapping the sensor, and
a transmittance of the first area is higher than a transmittance of the second area.

7. The electronic device of claim 1, wherein
the image is a white image, a red image, a green image, or a blue image, and
the image is displayed on a portion of the display panel.

8. The electronic device of claim 1, further comprising:
an auxiliary instrument unit covering at least a portion of the display panel and including a reflective member.

9. The electronic device of claim 1, wherein
the display panel is folded and unfolded,
the display panel displays the image in case that the display panel is folded, and
the luminance data is obtained in case that the display panel is folded.

10. A method of driving an electronic device, the method comprising:
obtaining luminance data by capturing an image displayed by a display panel including pixels by using a sensor;
storing a cumulative amount of stress applied to the pixels;
calculating a weight based on the luminance data and initial luminance data;
calculating a compensation value based on an intermediate compensation value corresponding to the cumulative amount of the stress and the weight; and
generating corrected image data based on the compensation value in image data provided to the pixels, wherein the calculating of the weight includes:
calculating a panel deterioration amount by subtracting the luminance data from the initial luminance data and dividing the subtracted luminance data by the cumulative amount of the stress; and
calculating the weight by dividing the panel deterioration amount by a model average deterioration amount and then multiplying the divided panel deterioration amount by a characteristic coefficient.

11. The method of claim 10, wherein the compensation value is updated in case that the display panel is in an off state.

12. The method of claim 10, wherein the sensor is a camera module or an optical fingerprint sensor.

13. The electronic device of claim 10, wherein the obtaining of the luminance data includes:
displaying the image on the display panel in case that the display panel is in a folded state; and
obtaining the luminance data from the image by using the sensor.

14. The method of claim 13, wherein
the display panel includes:
a folding area,
a first non-folding area overlapping the sensor, and
a second non-folding area spaced apart from the first non-folding area with the folding area disposed between the first non-folding area and the second non-folding area, and
the image is displayed in the second non-folding area.

15. An electronic device comprising:
a display panel including pixels, the display panel that is folded and unfolded;
a sensor that obtains luminance data of an image displayed on the display panel in case that the display panel is folded; and
a signal controller that receives image data and outputs corrected image data based on a compensation value in the image data,
wherein the signal controller includes:
an accumulator that stores a cumulative amount of stress applied to the pixel;
a weight calculator that calculates a weight based on the luminance data and initial luminance data;
a memory that stores a lookup table in which a plurality of intermediate compensation values according to the cumulative amount of the stress are stored and a model average deterioration amount; and
a compensator that calculates the compensation value based on the plurality of intermediate compensation values and the weight, corrects the image data based on the compensation value, and outputs the corrected image data.

16. The electronic device of claim 15, wherein the weight calculator calculates the weight based on following equations:

Panel deterioration amount=(initial luminance data−luminance data)/cumulative amount of stress, and Weight=panel deterioration amount/model average deterioration amount*characteristic coefficient.

17. The electronic device of claim 15, wherein
the display panel includes:
a folding area,
a first non-folding area overlapping the sensor, and a second non-folding area spaced apart from the first non-folding area with the folding area disposed between the first non-folding area and the second non-folding area, and the image is displayed in the second non-folding area.

18. The electronic device of claim 15, wherein the plurality of intermediate compensation values and the model average deterioration amount are values that are obtained from a plurality of test display panels and stored.

* * * * *